US009066144B2

(12) United States Patent
Yerli

(10) Patent No.: US 9,066,144 B2
(45) Date of Patent: Jun. 23, 2015

(54) INTERACTIVE REMOTE PARTICIPATION IN LIVE ENTERTAINMENT

(71) Applicant: Gface GmbH, Frankfurt am Main (DE)

(72) Inventor: Cevat Yerli, Frankfurt am Main (DE)

(73) Assignee: Crytek GmbH, Frankfurt am Main (DE)

( * ) Notice: Subject to any disclaimer, the term of this patent is extended or adjusted under 35 U.S.C. 154(b) by 0 days.

(21) Appl. No.: 13/651,153

(22) Filed: Oct. 12, 2012

(65) Prior Publication Data

US 2013/0097635 A1 Apr. 18, 2013

Related U.S. Application Data

(60) Provisional application No. 61/546,990, filed on Oct. 13, 2011.

(51) Int. Cl.
*H04N 7/173* (2011.01)
*H04N 21/475* (2011.01)
*H04N 21/2187* (2011.01)

(52) U.S. Cl.
CPC ....... *H04N 21/4756* (2013.01); *H04N 21/2187* (2013.01); *H04N 21/4758* (2013.01)

(58) Field of Classification Search
USPC ..................... 725/24, 37, 105, 106
See application file for complete search history.

(56) References Cited

U.S. PATENT DOCUMENTS

| | | | |
|---|---|---|---|
| 8,391,825 B2 * | 3/2013 | Arseneau et al. | 455/403 |
| 8,542,682 B2 * | 9/2013 | Thyni et al. | 370/390 |
| 2002/0119823 A1 | 8/2002 | Beuscher | |
| 2002/0174425 A1 * | 11/2002 | Markel et al. | 725/13 |
| 2006/0094409 A1 | 5/2006 | Inselberg | |
| 2006/0104600 A1 * | 5/2006 | Abrams | 386/46 |
| 2007/0021058 A1 | 1/2007 | Arseneau | |
| 2008/0043089 A1 | 2/2008 | Auerbach | |
| 2008/0046910 A1 * | 2/2008 | Schultz et al. | 725/12 |
| 2009/0013263 A1 * | 1/2009 | Fortnow et al. | 715/753 |
| 2009/0293079 A1 | 11/2009 | McKee | |
| 2010/0153861 A1 * | 6/2010 | Henshaw et al. | 715/758 |
| 2011/0223994 A1 | 9/2011 | Yerli | |
| 2011/0223996 A1 | 9/2011 | Yerli | |
| 2012/0123811 A1 * | 5/2012 | Socolof | 705/5 |

FOREIGN PATENT DOCUMENTS

WO 2008/017856 A2 2/2008

OTHER PUBLICATIONS

European Search Report mailed Jun. 30, 2014, in European Patent Application No. 12188001.7, filed Oct. 10, 2012, 10 pages.

* cited by examiner

*Primary Examiner* — Mulugeta Mengesha
(74) *Attorney, Agent, or Firm* — Christensen O'Connor Johnson Kindness PLLC

(57) ABSTRACT

A system and method for remote participation in live events are described. The system comprises one or more interactive environments, each hosting a live event and including means for continuously recording the interactive environment; a transmitter coupled to the one or more interactive environments, configured to receive from each interactive environment the respective recording and to transfer each recording to at least some of a plurality of remote viewers; a processing unit configured to receive feedback related to one of said live events from two or more of the remote viewers, wherein, based on the feedback, the processing unit is configured to determine an interactive environment hosting the related live event and to directly update the determined interactive environment based on the feedback.

21 Claims, 4 Drawing Sheets

INTERACTIVE REMOTE PARTICIPATION IN LIVE ENTERTAINMENT

FIELD

The present disclosure relates to interactive remote participation in live events and entertainment and, more particularly, to a system and a method for remote participation in live events hosted by interactive environments.

BACKGROUND

Live events and entertainment are often provided to a remote audience, for example, via traditional TV broadcasting or other distribution methods. However, the remote audience is often limited to an observation of the live event and there is no possibility for interaction with the live event. In particular, old-fashioned TVs only allow receiving the broadcasted data and have no capabilities to transfer any feedback on the live event watched via the TV broadcasting. Thus, any feedback, such as a telephone call or a written opinion sent to the broadcaster or organizer of the live event or entertainment, is typically delayed with regard to the live event and may not directly and instantaneously influence the live event and the course of action of the live event. At the most, only the local spectators may contribute to the live event if the live event and the number of spectators are limited.

Also, live events are typically hosted and managed by separate organizers and any received feedback is typically processed separately from each other, often requiring separate organizational structures. However, from a point of view of an organizer, it would be desirable to have the capability to manage and broadcast several independent live events and to receive and process any feedback on one of these live events through a centralized infrastructure.

SUMMARY

In view of the above, present disclosure describes various embodiments that enable a direct and instantaneous participation of a remote audience in live events and entertainment, and enable a flexible management of live events as well as the feedback received from the remote audience.

A system for remote participation in live events according to the present disclosure comprises one or more interactive environments, each hosting a live event and each including means for continuously recording the interactive environment. The system further comprises a transmitter coupled to the one or more interactive environments, which is configured to receive from each interactive environment the respective recording and to transfer each recording to at least some of a plurality of remote viewers. Furthermore, the system includes a processing unit, which is configured to receive feedback related to one of said live events from two or more of the remote viewers, and which, based on the feedback, is configured to determine an interactive environment hosting the related live event and to directly update the determined interactive environment based on the feedback.

Thus, the present disclosure provides a communication channel from each of the remote viewers, or audience, back to the provider of the recording of the live event and the interactive environment. The incoming data, such as the feedback and any further data from the remote viewers, is processed by the processing unit and directly, for example, instantaneously or with a short delay only, provided to the related interactive environment hosting the live event. The processing unit may be configured to directly invoke an action within the affected interactive environment or may pass the processed data to the environment, such that the interactive environment further processes the data and determines a suitable action based on the feedback and/or the processed data. The invoked action preferably directly modifies the interactive environment and may therefore directly affect the course of action within the live event. For example, the processed data may be presented within the interactive environment, i.e., at the location of the live event. Such presentation may be, in turn, recorded by the corresponding means and transferred to the remote viewer, therefore creating an immediate response on the feedback of the remote viewer.

Therefore, the present disclosure allows a remote audience that is observing a live event or entertainment from a remote location to participate in the live event directly. Hence, the group of local spectators and any audience being capable of interacting with the live event is enlarged by the remote audience including the remote viewers.

Each interactive environment may comprise any means or devices capable of providing the required functionality for performing the live event and/or entertainment. For example, the interactive environment may be a television studio, concert hall, or a sports stadium, including one or more recording means, such as television and video cameras, as well as interactive means for providing the received feedback within the interactive environment, such as display boards, communication means coupled to the performers and players of the live event, as well as feedback means directly influencing the configuration of the interactive environment, for example, affecting lifting ramps, lighting, the recording means, and others. However, the interactive environment may also be a computer-generated environment, entirely produced by one or more processing units, such as a virtual, interactive scene or game, wherein the recording means may comprise rendering modules and the feedback means may be provided by interfaces affecting the virtual scene or game. However, it is to be understood that the interactive environment may also comprise a combination thereof, mixing a real-world interactive environment with a computer-generated scenario.

The transmitter coupled to each of the interactive environments hosting the respective live event and the processing unit receiving and/or processing the feedback may be provided within one processing system, such as on a server. However, the transmitter and the processing unit may also be provided on separate processing systems and may also be provided in different locations. For example, the processing unit may be located in spatial proximity to the interactive environments, whereas the transmitter may be located at an environment or facility providing the functionality to transfer the recordings to the remote viewers, such as a broadcasting station.

Each remote viewer may watch the recording of one live event. However, a remote viewer may also watch a plurality of recordings. Preferably, the remote viewer may be registered at the inventive system, such that the processing unit may directly determine which live events the remote viewer may participate in. This enables a fast determination of the affected interactive environment and may speed up the processing of any incoming feedback.

The present disclosure provides a flexible approach, which enables an improved management of live events via interactive environments that are coupled to a transmitter for broadcasting of recordings of the respective live event, as well as to a processing unit, which collects feedback from the remote audience and provides the processed feedback to the respective interactive environment, which directly affects the course of action within the interactive environment. The present disclosure therefore allows for an instantaneous remote interaction with the live event.

In a preferred embodiment of the present disclosure, the system further comprises one or more feedback channels to couple at least some of the remote viewers to the processing unit, wherein each feedback channel is associated with one interactive environment. Each feedback channel may be established whenever at least one remote viewer starts receiving the recording of a desired live event. In such case, the remote viewer may register at the system and request the recording of the live event. The system may directly connect the remote viewer to the feedback channel associated with the respective interactive environment. Thus, one or more remote viewers of an interactive environment may provide feedback to the processing unit via one feedback channel associated with the interactive environment being watched by the remote viewers. In addition, each remote viewer may be coupled to the processing unit via a newly created feedback channel. The system may register the remote viewer and the related feedback channel at the processing unit. For example, the processing unit may comprise a memory storing information linking each registered remote viewer to one or more interactive environments hosting live events that are being watched by the remote viewer. However, it is to be understood that one feedback channel may also be linked to each remote viewer receiving at least one recording. Thus, each remote viewer may communicate with the processing unit using a distinct feedback channel irrespective of the number of recordings that are being watched by the remote viewer.

According to an embodiment of the present disclosure, the system further comprises one or more transfer channels, each associated with one interactive environment, wherein the processing unit is configured to transfer the recording of an interactive environment to at least some of the remote viewers via the associated transfer channels.

Preferably, the transfer channels and the feedback channels are provided within one network. For example, the network may comprise a cable television network providing the capability of transferring feedback from a device of a remote viewer, such as a set-top box, to the processing unit. The transfer and feedback channels may also be provided within a communication network, such as the Internet, wherein preferably the transfer channels are broadcast or multicast links and the feedback channels are unicast links between each remote viewer and the processing unit. However, it is to be understood that the feedback channels and the transfer channels may also be provided within separate networks.

In a further embodiment of the present disclosure, the system further comprises a security component configured to authenticate a remote viewer and to authorize participation of the remote viewer in one of said interactive environments. Each remote viewer may connect to the security component and may use an authentication and/or security protocol to authenticate at the system. For example, the user may provide a password or other authentication data to prove its identity. Also, any other suitable authentication approach may be used providing the desired level of security, such as challenge-response authentication using smart cards and other cryptographic and security methods. After authentication, the remote viewer may also request participation at a live event. For example, the system may require the remote viewer to provide further authentication or may check a security level of the remote viewer enabling the remote viewer to participate. The security component may also require the remote viewer to confirm the participation including payment of fees for the participation. Also, the remote viewer may be directly allowed to participate. However, if a particular feedback from that user is received by the processing unit, the remote viewer may be asked to pay for the desired interaction.

According to another embodiment of the present disclosure, the processing unit comprises a middleware module configured to asynchronously organize the communication between the processing unit and the plurality of remote viewers. The middleware module may be run on one or more processing devices and may comprise the processing unit. The middleware module may expose a plurality of network connections receiving the feedback of the remote viewers and transferring the data processed by the processing unit to the respective interactive environments. The middleware module may run a plurality of threads, each receiving feedback from one of the feedback channels, which may also buffer and pre-process the received feedback. For example, each thread may asynchronously determine an identification of the remote viewer and respective associations to interactive environments. In addition, each thread may extract from each feedback the data identifying the live event related to the feedback. Each thread may also determine the actions available in the respective interactive environment and may determine a suitable action that is to be invoked in the interactive environment in response to the feedback. Thereafter, each thread may pass the pre-processed feedback data to the processing unit, which may further analyse the data and either pass it to the affected interactive environment and/or directly invoke the suitable action within the affected interactive environment.

In an embodiment of the present disclosure, a plurality of local viewers in at least one of said interactive environments are coupled to the processing unit via one of said feedback channels. Furthermore, the processing unit according to this embodiment is configured to receive feedback related to the local live event from at least one of the local viewers and, based on the received feedback, update the local interactive environment. In particular, the system may treat the local and the remote viewers, spectators, or audience in the same or a similar way, such that any feedback may be handled similarly irrespective of whether the viewer is directly present at the live event. However, the system may also manage local and remote viewers differently from each other. In particular, the system does not need to allocate resources for transfer of the recordings to the local viewers.

In a further embodiment of the present disclosure, the transmitter is configured to broadcast and/or to stream the recording via at least one of the transfer channels, preferably including a television channel and an internet live stream.

In yet another embodiment of the present disclosure, the system further comprises, at each remote viewer, an interaction device including an output device for receiving and rendering at least one recording and an input device for generating feedback on the displayed at least one recording, wherein the interaction device preferably includes at least one of a personal computer, a game console, a mobile device, a set-top box, an internet terminal, and a telephone. For example, a remote viewer may use any interactive media device, such as a television device linked to a communication network, a smart phone, a personal computer, a game console, and/or other devices, which are capable of communicating with the system and establishing feedback channels, for example, via the Internet, telephone lines, or other connections and networks, in order to communicate feedback to the live event.

According to an embodiment of the present disclosure, the processing unit is further configured to process the feedback from a plurality of remote and/or local viewers and compute at least one value based on the processed feedback. For example, the viewers may be asked to provide an opinion or vote on a particular event. The processing unit may collect the answers for a predetermined amount of time and may generate a value, such as an average value of the received feedback data. For example, the processing unit may poll votes on a plurality of choices for a couple of seconds or minutes and may trigger the affected interactive environment to display the results of the survey. However, it is to be understood that the processing unit may also process one feedback after another and consecutively update the determined interactive environment. A method for processing of feedback, such as input received from a plurality of users applicable in the method, is disclosed in the pending application "A Multi-user Computer-controlled Input System and a Method of Compressing and Processing Multiple Input Data," U.S. Provisional Patent Application No. 61/311,827, the disclosure of which is incorporated by reference.

Preferably, based on the received feedback, the processing unit is configured to update the interactive environment by initiating an action within the interactive environment. For example, the processing unit may receive the opinions or votes on a particular event and may compute one or more values, such as average values of the received feedback data, and may use the data to invoke a corresponding action within the interactive environment. For example, the remote viewers may directly decide on the course of action of the live event and the processing unit may poll opinions on the desired course of action for a couple of milliseconds or seconds and may directly initiate a corresponding action within the interactive environment. For example, the initiated action may comprise influencing and controlling an entity of the live event, such as a real or virtual object of a game. A method for controlling entities of live events applicable in the method is disclosed in the pending application "A Multi-user Computer-controlled Video Gaming System and a Method of Controlling at least one Game Mechanic," U.S. Provisional Patent Application No. 61/311,834, the disclosure of which is incorporated by reference.

In an embodiment of the present disclosure, based on the received feedback, the processing unit is configured to generate a visual representation and to update the interactive environment by displaying said visual representation within the interactive environment.

According to a further embodiment of the present disclosure, each feedback includes a tag specifying an occurrence during the live event. The live event may comprise a sequence of occurrences, such as certain actions performed by actors or players of the live event or virtual characters of a computer-generated interactive environment, and each feedback may be related to one of these occurrences. For example, each occurrence may be associated with a time stamp and/or duration. The corresponding feedback may specify a certain point in time which falls into the time span identified by the time stamp and/or duration. Also, each occurrence may be associated with a unique identifier and the feedback may include said identifier.

According to an embodiment of the present disclosure, each live event is preferably one of a sports event, a cultural event, a social event, a television show, a political speech, and a live conference. Also, a live event may be any event taking place in a real world environment. However, it is to be understood that each live event may also at least partially comprise computer-generated objects and/or enhancements, such as computer-augmented parts of the real world environment.

Yet, the interactive environment may also preferably be a computer-generated environment, including at least one of a concurrently or synchronously experienced game-session, a live collaborative engagement of users, and a social environment.

Furthermore, a client device for remote participation in live events according to the present disclosure is coupled to a system according to the present disclosure and configured to receive from a transmitter of the system one or more recordings of an interactive environment hosting a live event, and sending feedback related to one of said live events back to a processing unit of the system, such that, based on the feedback, the interactive environment hosting the live event is directly updated.

A method for remote participation in live events according to the present disclosure comprises the steps of providing one or more interactive environments, each hosting a live event; continuously recording the interactive environment; receiving from each interactive environment the respective recording and transferring each recording to at least some of a plurality of remote viewers; receiving feedback related to one of said live events from two or more of the remote viewers; determining, based on the feedback, an interactive environment hosting the related live event; and directly updating the determined interactive environment based on the feedback. The inventive method improves the handling of live events being watched by a plurality of remote viewers and enables a direct interaction and participation of the remote viewers with the live events.

In an embodiment of the present disclosure, the method further comprises providing one or more feedback channels, each feedback channel to transfer feedback associated with one of the interactive environments.

According to another embodiment of the present disclosure, the method further comprises providing one or more transfer channels, each transfer channel to transfer the recording of one interactive environment to at least some of the remote viewers.

In an embodiment of the present disclosure, the transfer channels and the feedback channels are provided within one network.

In yet another embodiment of the present disclosure, the method further comprises authenticating a remote viewer and authorizing participation of the remote viewer in one of said virtual environments.

Preferably, the method further comprises asynchronously organizing communication with the plurality of remote viewers.

According to an embodiment of the present disclosure, the method further comprises receiving from at least one of a plurality of local viewers in an interactive environment feedback related to the local live event and, based on the received feedback, updating the local interactive environment.

According to another embodiment of the present disclosure, said transferring the recording includes broadcasting and/or streaming the recording via at least one of the transfer channels.

According to an embodiment of the present disclosure, the method further comprises, at each remote viewer, receiving and rendering at least one recording and generating feedback on the displayed at least one recording.

In yet another embodiment of the present disclosure, the method further comprises processing the feedback from a plurality of remote and/or local viewers and computing at least one value based on the processed feedback.

In an embodiment of the present disclosure, the method further comprises, based on the received feedback, updating the interactive environment by initiating an action within the interactive environment.

Preferably, the method further comprises, based on the received feedback, generating a visual representation and updating the interactive environment by displaying said visual representation within the interactive environment.

Furthermore, a computer-readable medium according to the present disclosure has instructions stored thereon, said instructions, when installed and executed on a computing device, causing said computing device to perform a method according to the present disclosure. In particular, said instruction may be directly read or downloaded, installed, and executed in one or more interactive environments, each hosting a live event, and may cause means in each interactive environment to record the interactive environment and to transfer the recording to a transmitter. Correspondingly, the instructions may also be directly read or downloaded, installed, and executed on the transmitter, causing the transmitter to receive the respective recording and transfer each recording to at least some of a plurality of remote viewers. Said instructions may also be directly read or downloaded, installed, and executed on a computing device of each remote viewer, enabling the remote viewer to watch at least some of the recordings and send feedback related to one of said live events. Furthermore, said instructions may also be directly read or downloaded, installed, and executed on a processing unit, configuring the processing unit to receive feedback related to one of said live events from two or more of the remote viewers, to determine, based on the feedback, an interactive environment hosting the related live event, and to directly update the determined interactive environment based on the feedback.

DESCRIPTION OF THE DRAWINGS

Further details and characteristics of the present disclosure are described in exemplifying embodiments with reference to the figures of the accompanying drawings, in which.

DETAILED DESCRIPTION

Figure 1:
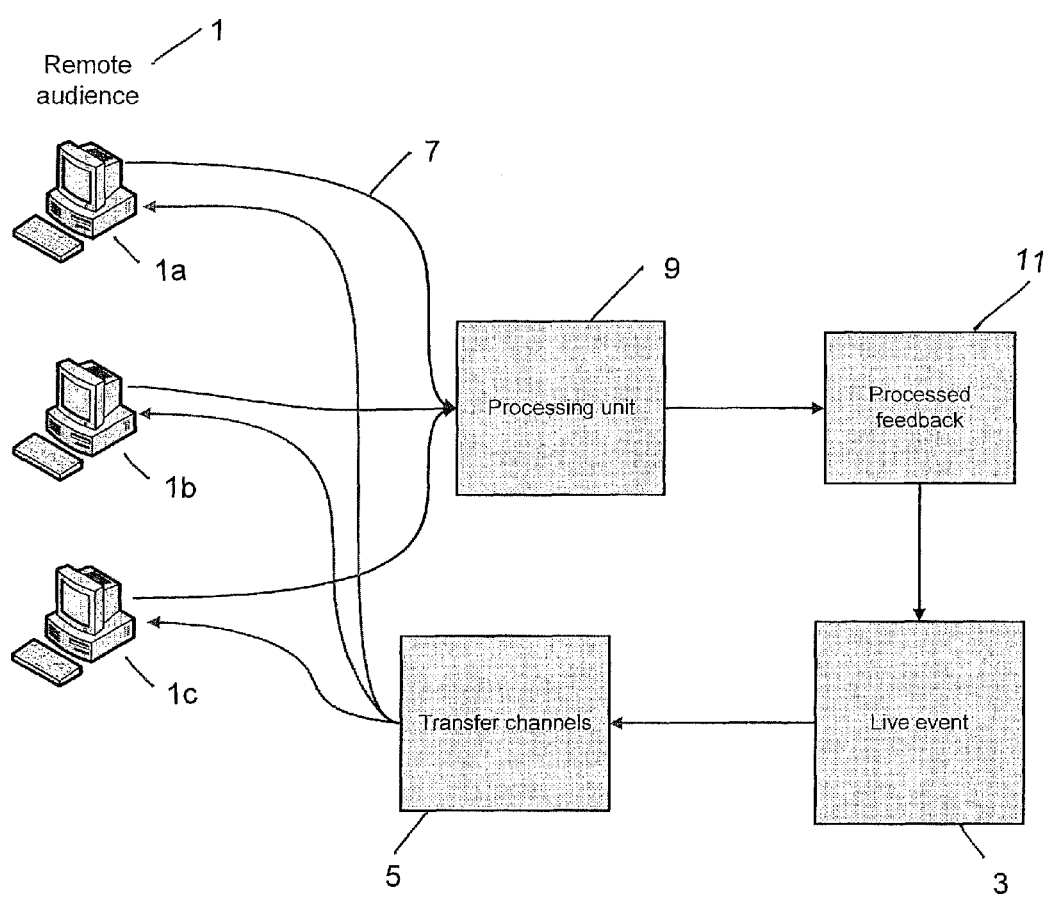
FIG. 1 shows a schematic representation of a system according to an embodiment of the present disclosure.

FIG. 1 shows a schematic representation of a system according to an embodiment of the present disclosure. The system enables a remote audience 1, including remote viewers 1a, 1b, 1c, to watch a live event 3 via one of a plurality of transfer channels 5, for example, using a TV, an internet live stream, a game console, a mobile device, and others. The remote audience 1 may be connected via any digital connection such as the Internet, a phone line, or the like. The audience may enter feedback on the watched live event 3 via a feedback channel 7 to a processing unit 9, either by using the same device, for example, a game console with a controller or a personal computer, or another device (not shown). For example, one of said remote viewers 1a, 1b, 1c may watch the live event 3 on a TV and enter feedback via a mobile phone. Both the transfer channel 5 and the feedback channel 7 may be operated by a remote viewer 1a, 1b, 1c through the same device, for example, the game console. Both channels 5, 7 may, however, also be separated and operated via two separate devices, e.g., a TV set to watch the live event 3 via the transfer channel 5 and a mobile phone to send feedback to the processing unit 9 via the feedback channel 7.

Even though transfer channels 5 have been described in relation with a visual representation of the recording of the live event 3, it is to be understood that a recording of the live event 3 or the data transferred via at least some of the transfer channels 5 need not comprise video data. Rather, the live event 3 may also be broadcasted for example, via radio or a live text feed on the Internet, and a remote viewer 1a, 1b, 1c is not restricted by a modality of the broadcasting. Hence, the remote viewer 1a, 1b, 1c may fully participate in the live event 3 irrespective of the data received via the transfer channel 5. Also, it is to be understood that a broadcasting of a live event, such as the live event 3, may be different for each of the remote viewers 1a, 1b, 1c, for example, remote viewers 1a and 1b watching a television broadcasting of live event 3 and remote viewer 1c receiving a radio broadcasting of the live event 3.

The processing unit 9 may collect all incoming feedback data from the remote audience 1. The processing unit 9 may be connected to the remote audience 1 via any suitable communication network capable of providing feedback channels 7, such as the Internet, phone lines, or other networks. The processing unit 9 may process the received feedback into data 11 suitable for directly and instantaneously updating, modifying and/or affecting the live event 3. In particular, the processing unit 9 may determine an interactive environment based on data of the feedback specifying the live event 3 being watched by the creator, i.e., one of said remote viewers 1a, 1b, 1c, of the remote audience 1. After processing, the processing unit 9 may transfer the processed data 11 to the interactive environment hosting the live event 3 via a suitable connection or network.

The incoming feedback data may preferably be processed into a presentable format. The format may differ depending on the live event 3, the available set of actions for the remote audience 1, as well as presentation capabilities of the interactive environment hosting the live event 3. Furthermore, the processed data 11 may represent a collective feedback in which each remote viewer 1a, 1b, 1c may provide the same type of feedback 7 with a different value, such as a vote, or in which a chosen group of remote viewers 1a, 1b, 1c, chosen randomly or using other methods, may return personalized feedback 7. For example, one remote viewer 1a, 1b, 1c at a time may enter a feedback 7 including a text message, which may be displayed within the interactive environment hosting the live event 3 for a certain time.

The live event 3 may preferably be any typical live event that may be delivered, digitally distributed, or broadcasted to a remote audience 1, such as a sports match, a concert, a television show, a political speech, a party, a live conference, a concurrent and synchronous experienced game-session, live collaborative engagement of multiple users, and the like. Preferably, the processed data 11 of the feedback 7 may directly influence the live event 3. For example, a message included within the feedback 7 may be presented at the live event 3 without a delay or, at most, with a limited delay. Thus, the system enables a direct remote participation and interaction of the remote audience 1 in a new and advantageous way which was not previously possible.

The transfer channels 5 may provide a digital distribution of recordings of the live event 3, which may be similar to a usual TV broadcast station. However, the present disclosure is not limited to such processing of the recordings of the live event 3. Rather, the recordings may also be transferred via the Internet or other communication networks enabling multicast and/or broadcast connections, especially if the live event 3 and the devices of the connected remote audience 1 are not typically included within a TV broadcast chain.

The remote viewers 1a, 1b, 1c may use any suitable device, such as a TV set, a set-top box, PCs, game consoles, mobile phones, laptops, mobile game consoles, and the like. Preferably, the devices may be capable of connecting to a transfer system providing the transfer channels 5 and are preferably able to implement a method, for example, via downloading, installing, and/or executing instructions, such as an application, that allows a transfer of the feedback 7 to the processing unit 9.

It is to be understood that while the remote audience 1 is preferably physically separate from the other components of the system, the processing unit 9, the transfer system providing the transfer channels 7, and the interactive environment hosting the live event 3 may also be located in the same location or in spatially proximate locations. However, the processing unit 9, the transfer system, and the interactive environment may also be provided in remote locations as well. Similarly, at least some of the remote viewers 1a, 1b, 1c may also be directly present at the live event 3, thus forming at least a part of the local audience.

Figure 2:
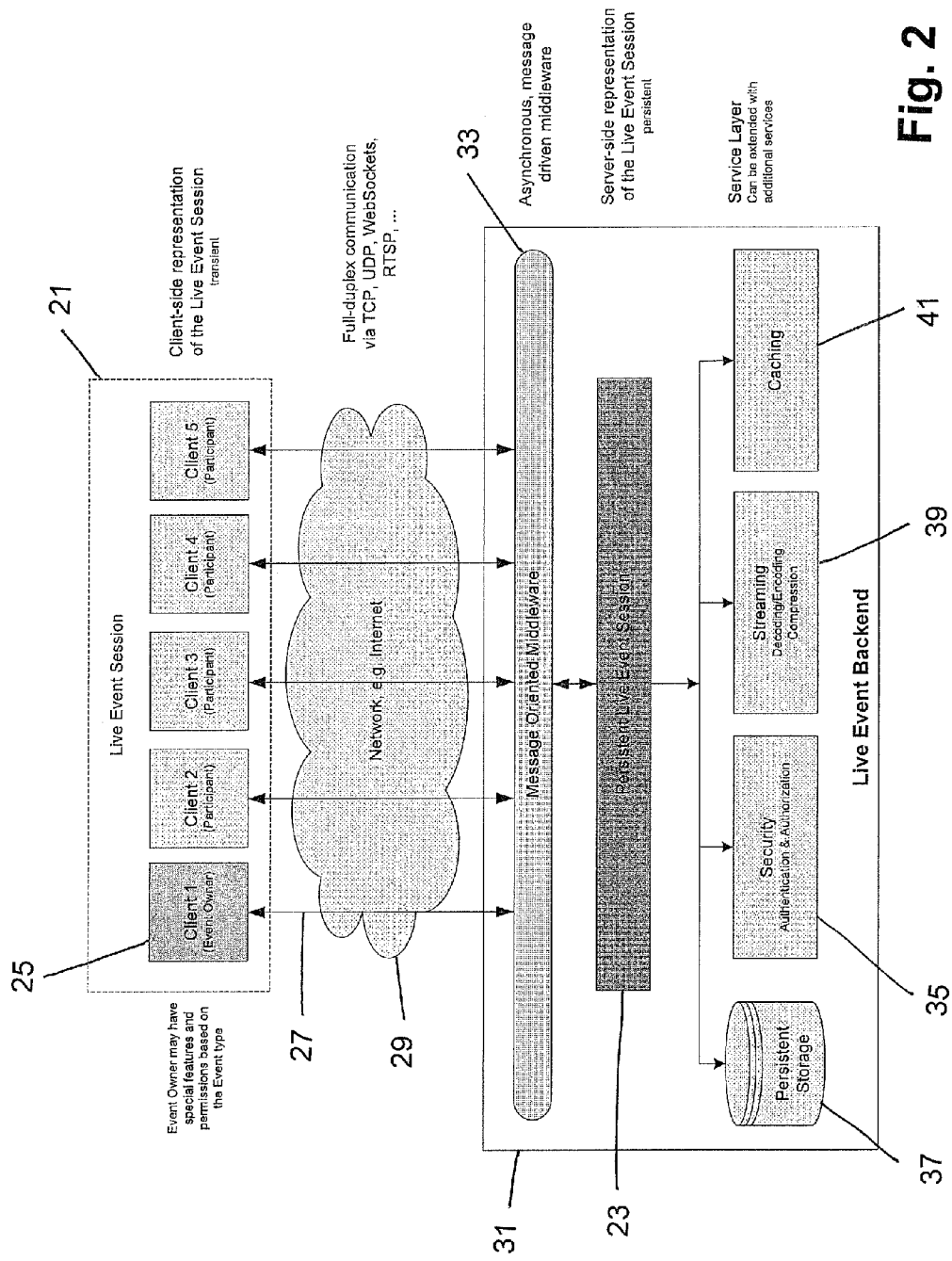
FIG. 2 shows a schematic illustration of a system according to an embodiment of the present disclosure, detailing the organization of a live event session.

FIG. 2 shows a schematic illustration of a system according to an embodiment of the present disclosure, detailing the organization of a live event session. A live event may be represented by a transient live event session 21 on a client side as well as a persistent live event session 23 on a server side of the system. A client 25, such as "Client 1," which may be a remote viewer of a remote audience, may create the live event. The client 25 may therefore be denoted as an owner of the live event. The owner of the live event may have special features and permissions with regard to interaction and participation with the live event based on the type of the live event. The remote audience may furthermore include additional clients, such as "Client 2" to "Client 5," that may participate and interact with the live event. However, it is to be understood that the present disclosure is not restricted to a remote audience of a particular size and number. Rather, the number of remote viewers and clients is not restricted and may only be limited by available processing resources of the system. Also, the creator and owner of a live event need not be part of the remote audience.

The client 25 may, for example, provide feedback by uploading a video via a feedback channel 27 within a network 29 to a live event backend 31 of the system. The video data may first be handled by a message-oriented middleware 33, where it may be provided to the subsequent layers of the system for authorization via a security component 35, storage via a persistent storage 37, streaming by a streaming component 39, and caching by a caching device 41. Yet, it is to be understood that client 25 may also upload the video in order to create a new live event to which the other clients may connect. The video may, for example, be streamed in an interactive environment, which is recorded and provided to remote viewers. Based on the recording, the connected clients may provide feedback on the video and the feedback may be directly displayed within the interactive environment. Thus, the feedback will be preferably immediately visible to the other clients observing the live event.

Further clients participating in the live event via the network 29 or another network (not shown) that may also be connected to the live event backend 31 of the system may preferably be connected as single entities to the message-oriented middleware 33 that organizes these clients in an asynchronous way. The message-oriented middleware 33 handles all further communication of the clients with the live event through the persistent live event session 23 and also any streaming towards the clients. The requests of the clients to participate in a live event are preferably processed in the same manner. For example, the security component 35 may authorize access of a client to a live event, and the persistent storage 37 may be instructed to fetch requested data, such as a recording of the live event, which may further be cached in the caching device 41. In the case that a request is not cached and immediately ready for the audience, the system may fetch necessary data from the persistent storage 37 directly and stream the data towards the client via the streaming component 39. Furthermore, any interaction of the clients with the live event may also be handled in the same way. For example, feedback is transferred via one of said feedback channels 17 via the network 29 or an additional network, processed by the live event backend 31, causing the live event immediately and directly to update. The results may be streamed by the streaming component 39 towards the connected remote clients, for example, via a live recording of the live event. The streaming component 39 may compress and encode the results. In addition, the streaming component 39 may encode the results based on data from authentication and authorization of the client provided by the security component 35.

The network 29 preferably enables a full-duplex communication, for example, via TCP, UDP, WebSockets, RTSP, and others. For example, the network 29 may be the Internet. However, it is to be understood that the present disclosure is not limited to a certain type, topology, or configuration of a network. Furthermore, the persistent storage 37 may be any type of suitable storage, such as a memory unit, a local, remote, or distributed database or another kind of storage device capable of storing live event related data in a persistent way. Also, the security component 35 may allow for authentication and authorization of remote viewers, such as the clients, using any suitable authentication and authorization mechanism. Furthermore, it is to be understood that the service layers of the live event backend 31 may be extended with additional services, for example, services related to accounting and advertisement booking, to name some.

Figure 3:
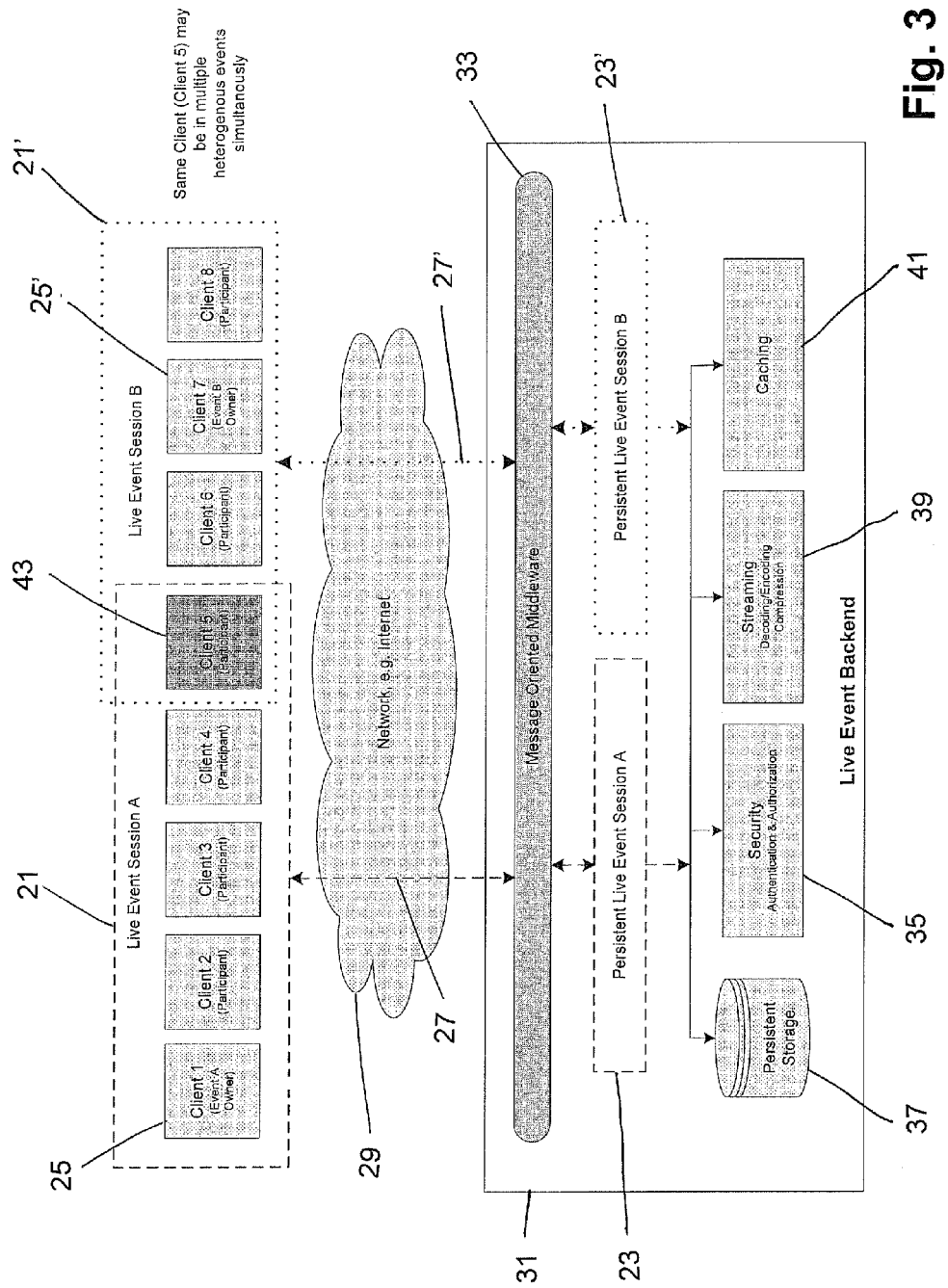
FIG. 3 shows a schematic illustration of a system according to an embodiment of the present disclosure, detailing the organization of a plurality of live event sessions.

FIG. 3 shows a schematic illustration of a system according to an embodiment of the present disclosure, similar to the system of FIG. 2. Therefore, features in FIG. 3 similar to features of FIG. 2 are denoted by the same numerals. In addition to the system of FIG. 2, FIG. 3 also details a management and organization of a plurality of live event sessions, which relate to live events that may happen independently of each other. The system may handle multiple live event sessions separately, whenever multiple live events are happening at the same time or at overlapping times.

For example, a first live event A may be represented as a transient live event session A at a client side, such as the transient live event session 21, and as a persistent live event session A at a server side, such as the persistent live event session 23. The corresponding live event A may be initiated, created, and owned by a remote viewer 25, and a group of further remote viewers, such as "Client 2" to "Client 5" may interact and participate with the live event A via feedback channels 27 provided via a network 29. The further processing may correspond to the processing described with regard to FIGS. 1 and 2.

In addition, the system may host a second live event B, which is represented as a transient live event session B on the client side 21' and a persistent live event session B on the server side 23'. The transient live event session 21' may define an owner of the live event B, such as remote viewer 25', as well as a group of further remote viewers participating and interacting with the live event B. For example, the owner of live event B may be a remote viewer 25', denoted as "Client 7", and further remote viewer, such as "Client 5", "Client 6", and "Client 8," may interact and participate in the live event B via feedback channels 27', which may also be provided via the network 29. However, it is to be understood that for interaction with live event B also, a different network may be used. Also, some of the remote viewers may use network 29 and other remote viewers may use a different network in order to participate in live event B.

As shown in FIG. 3, the groups of remote viewers related to live event A and live event B, respectively, need not be disjointed and may comprise overlapping clients. For example, remote viewer 43, which may be "Client 5," may participate in both live event A and live event B. Therefore, some remote viewers 43 might be participating in more than one live event. In this case, the message-oriented middleware 33 filters all requests and feedback of the remote viewers 43 towards the correct live event session so that the data is stored and processed in connection to the respective live event session. However, beside the message-oriented middleware 33, the system may also use the services provided by the security component 35, the persistent storage 37, the streaming component 39, and the caching device 41, to name a few examples, in order to process feedback and requests for both live event session A and live event session B. The use of one message-oriented middleware 33 and services 35, 37, 39, 41 for a plurality of live events being observed by a possibly overlapping group of remote viewers, greatly simplifies the organization and management of the live events and enables a flexible and direct participation and interaction with the live events.

According to an exemplary embodiment of the present disclosure, a remote audience may watch a live event, such as a football match, which may be broadcasted or streamed, either locally or through the Internet, to respective television and radio sets at home. Each remote viewer may use an application running on a mobile phone, an interactive TV device, or another similar interactive device in order to send feedback to a provider of the live event via a system according to an embodiment of the present disclosure. For example, a remote viewer may decide about a preferred team. The remote viewer may thereafter use and/or press one of a plurality of buttons indicating options for the respective feedback, such as two buttons indicating "cheering" and "booing", respectively. After selection, the feedback may be transferred back to the organizer via the system. A remote viewer may repeat the feedback procedure anytime while the football match is running The collected feedback data of all remote viewers and possibly local viewers connected to the system are processed, for example, in a processing unit, such as the processing unit 9 of FIG. 1, and the processed feedback may be presented, for example, on a score board in the stadium hosting the football match. In particular, the score board may show animated icons of fan groups cheering or booing, depending on a majority or average value derived from feedback of remote viewers associated with one of the teams playing the match.

In certain moments of the live event, like during scoring a goal, the remote viewers may provide a feedback which may comment on the action or occurrence, for example, by pressing buttons on their input devices with a certain meaning, such as "I like it/I agree" and "I don't like it/I disagree," respectively. These feedback data may preferably be collected for a certain time frame and may thereafter be presented as a poll on the stadium score board. Thus, the remote audience at home as well as the local audience at the live event are both able to watch the presented processed feedback.

Preferably, advanced feedback capabilities could include sending text messages, which may be displayed on the scoreboard or as perimeter advertising on further display devices. Also, such processing could include sending sounds and other media data to an audio system or a multimedia system within the stadium.

Furthermore, game-like actions could be initiated by the remote as well as by the local audience through the system. For example, whenever a certain number of remote and local viewers execute the same action, a multimedia animation or reaction may be shown on display devices in the interactive environment hosting the live event, such as the scoreboard within the stadium. If the participating audience manages to execute a certain number of reactions, for example, three of these reactions, the audience may be rewarded with a "bonus," like a sound or other multimedia content being played in the stadium.

In yet another exemplary embodiment of a system according to the present disclosure, the spectators of a theatre performance may be allowed to directly participate in the performance. The system could be used to connect a local audience that is directly present in an interactive environment, such as a theatre hall or a TV show studio, with a remote audience watching a recording of the performance at home using, for example, a TV set. Thus, the system allows for a much bigger group of spectators to participate in the live event. For example, the performed piece or show may include a courtroom trial. While the actors play several roles, such as a judge, lawyers, and suspects, the remote and local audience may act as a jury and may vote. While most of the show may not require any direct participation, the audience will stay engaged since they know that they will have to provide feedback and therefore should pay attention. In addition to feedback related to the final vote, the viewers may also be required to provide feedback influencing the progression of the trial. Furthermore, the audience may also directly control stage effects, like lights, fog, or sounds.

In yet another embodiment of a system according to the present disclosure, the visitors of a music event, such as a rock concert, may download small applications on their mobile phone devices that allow the visitors to connect with the system, for example, with the processing unit 9 shown in FIG. 1. Furthermore, a remote viewer watching and or listening to the music event, for example, via TV, radio, a live stream, or any other type of broadcasting, may download and install the application on an interaction device, such as a mobile device. The remote viewers may, however, also use interactive TV or an interactive set-top box in order to interact with the live event.

Particular display devices or devices capable of rendering multimedia content within the interactive environment hosting the music event, such as large or big screens behind the stage, may show a visual or multimodal representation of patterns and icons related to the music, which may be animated in response to any feedback received by the system. Furthermore, each connected visitor, such as any local or remote viewer, may have further feedback possibilities, e.g., by entering a voice input directly into a microphone of the mobile phone or the interaction device, by pressing push buttons or interacting with a touch screen on the mobile phone or interaction device to control the flow and representation of graphical and multimedia objects on the particular display devices, for example, by pushing LEFT, RIGHT, UP, or DOWN buttons, and by using further suitable interaction techniques in order to provide feedback on the live event to the system. In response to the number of viewers participating in the live event and the amount of feedback, the animation on the screen may become larger and more appealing. For example, the animation may get bigger and more colorful the more the remote and local audiences tune into the rhythm of the music of the live event. Also, different visual and multimedia representations, such as different patterns, may be used for different parts of the live event, such as different songs.

According to another embodiment of a system according to the present disclosure, a TV station may broadcast a trivia game show where participants can win money by answering questions. Remote viewers of the show may directly participate by sending a suggestion on the right answer as feedback to the player in the case a player does not know an answer. The player may consider the feedback and may communicate with the remote viewer, for example, by directly speaking to any means for recording the live event, such as TV cameras, and receiving further feedback from the remote audience until the player is sure he has received the right answer. The player and/or the interactive environment hosting the game show may also provide one of the remote viewers providing the initial guess on the right answer with enhanced access rights, such that any subsequent feedback of that remote viewer is handled with a certain preference and directly supplied to the player.

Another level of direct participation and interaction according to an embodiment of the present disclosure may include involving the remote viewers as actual players directly participating at the game show. Either one, some, or all remote viewers may be enabled to participate as players and answer questions in order to win the game show, resulting in a mixed group of players playing the game together (or against each other) being locally and/or remotely present at the game show's location.

In yet another exemplary embodiment of the present disclosure, an interactive environment hosting a game show may feature a dexterity-based challenge, like riding on a rodeo bull machine or maneuvering a boat through a simulated wild water river or within another computer-generated or simulated virtual environment. While some participants may be present at the location of the show, other participants may also be connected remotely and take part via the system according to an embodiment of the present disclosure. The participants could team up to support each other through different feedback channels. For example, the local participants may actually directly interact with the challenge by interacting with an input device of the dexterity-based challenge, such as sitting on the rodeo bull machine trying to balance on top of it, while the remote participants may either support the local participants by decreasing the force that the rodeo bull machine is moving around, or play against the local participants by increasing the force in order to push any local participant off the rodeo bull machine.

Also, several selections of remote viewers could be made, wherein the selected remote viewers only directly interact in the live event. For example, all remote viewers may be enabled to take part as a single huge group of remote viewers. In this case, the overall feedback of all remote viewers is collected and processed to generate a feedback representative of the whole group, such as an average feedback. As an alternative, single players may be randomly picked from the group of remote viewers in order to directly influence the live event. Also, a certain number of remote viewers, such as 5 randomly chosen players, may be defined as a group.

Furthermore, all connected remote viewers may take part in a pre-game and the selection of remote viewers directly participating in the live event may be based on the outcomes of the pre-games, such as including the winners of these pre-games. These pre-games can be scheduled and broadcasted to already registered remote viewers before a live event. The pre-games may also be the first part of a live event, similar to casting shows.

According to a further example embodiment of the system according to the present disclosure, a digital game tournament may be broadcasted via TV, video game consoles, an Internet site, or similar devices to a broad remote audience watching the live event. The remote audience may be capable of sending feedback to a central server, such as the processing unit 9 of FIG. 1. The central server may process the feedback data in order to enable participation of the remote viewer at the live event. As discussed above with regard to other exemplary embodiments, a remote viewer may participate by commenting and/or cheering with regard to a certain occasion or action during the live event, or may directly influence the actual digital game tournament.

For example, during the live event a certain number of players may be organized in several teams, each playing a digital game, such as a first-person shooter game. While teams may directly compete against each other, the whole remote audience may be able to influence the digital game in different ways, such as by (1) cheering for one of the teams and thus showing a respective support; (2) supporting one of the teams by delivering resources for the digital game, e.g., new equipment, weapons, bonuses, or the like; (3) adding neutral events to the game like starting an earthquake, changing the weather, adding a third hostile force controlled by artificial intelligence, etc.; and (4) adding other events to the progress of the digital game that are not controlled by the competing teams, or other possible interactions. The remote audience may watch the progress of the team match on one or more screens or views, as well as the actions invoked by the remote audience. The latter may be watched either on the same displays or screens or on separate displays or screens, such as a fan view that provides a view not only of the action of the live event but also of the local audience.

According to another exemplary embodiment of a system according to the present disclosure, users of a mobile input device that may connect, for example, to the Internet may join together in a gaming environment and jointly control the behavior of virtual objects of a digital game, such as steering a vehicle, by providing feedback data to the system. The interactive environment hosting the game may provide a media stream, for example, video, audio and/or other media, related to the game, which is transferred to all remote participants. The media stream or recording of the interactive environment may comprise any content related to the live event, such as a pre-rendered video stream of the game broadcasted to all remote participants or an abstract representation of the game environment, for example, data related to a scene graph or updates to the scene graph, which may be transferred to the devices of each remote participant and rendered on the respective device.

Each remote participant may send feedback related to a desired control of a virtual object of the game, such as the vehicle. The system may collect and process the feedback of all remote viewers and invoke a corresponding action within the interactive gaming environment based on the processed results. For example, the digital game may require steering a vehicle through an enjoyable environment and collecting bonus items while avoiding obstacles. The remote viewers may see via the recording of the interactive environment data about other remote viewers steering the vehicle and data about how many other remote viewers are connected to the interactive environment, as well as other information to increase the involvement and presence of the remote audience in the interactive environment hosting the live event. This approach advantageously allows for participation of remote viewers, which may be located anywhere. In particular, the remote viewers need not be, but may be, at the same location. The only requirement to connect to the inventive system according to an embodiment of the present disclosure is an interaction device, for example, a mobile phone or a non-portable device, such as a set-top box or a personal computer, enabling to watch the recording of interactive environment hosting the live event as well as to connect to the system to provide feedback in order to directly influence the interactive environment.

Even though, the inventive system and embodiments thereof have been described by means of exemplary embodiments, it is to be understood that the present disclosure is not limited to a particular live event as well as related processing and mode of participation and interaction, such as watching a sports event, interacting with a theatre performance or show, interacting during a music concert, participating in a television or game show, and/or being involved in a digital game tournament or an online crowd game. Rather, any live event which may be recorded and transmitted to a remote audience may be hosted by a system according to an embodiment of the present disclosure enabling the remote audience to directly participate and influence the live event.

Figure 4:
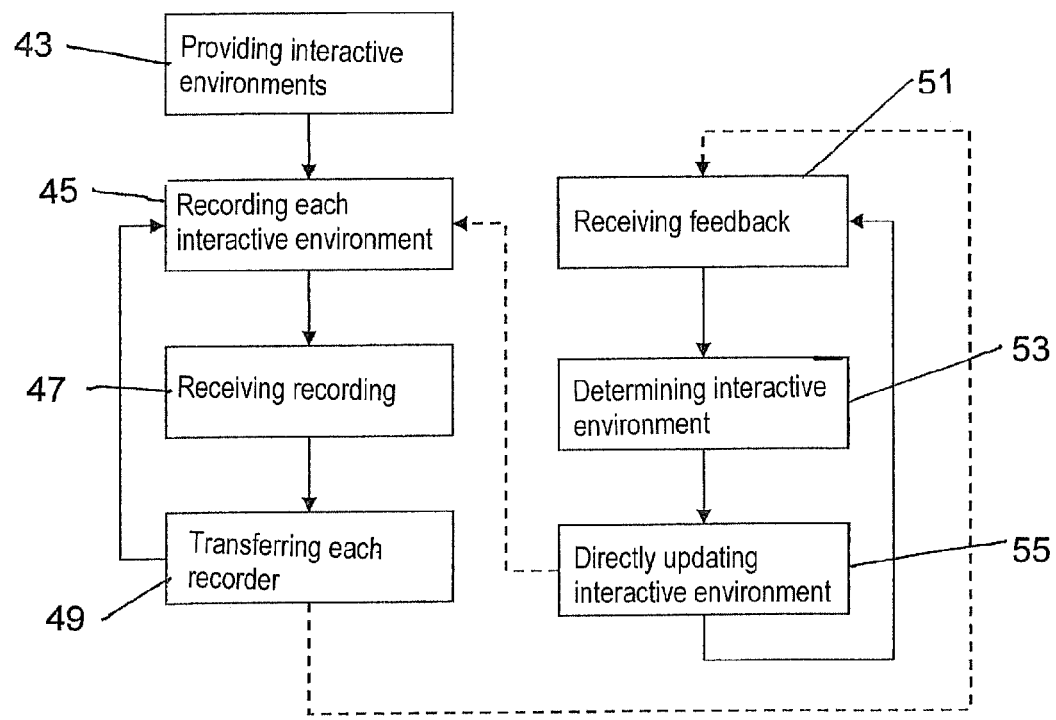
FIG. 4 shows a flow chart of a method according to an embodiment of the present disclosure.

FIG. 4 shows a flow chart of a method according to an embodiment of the present disclosure. The method may, for example, be executed by a system according to an embodiment of the present disclosure, such as the systems discussed with regard to FIGS. 1 to 3. At block 43, one or more interactive environments are provided, wherein each interactive environment hosts a live event. Each of the interactive environments is continuously recorded at block 45. At block 47, the respective recording is received from each interactive environment and each recording is transferred to at least some of a plurality of remote viewers at block 49. Thereafter, the method loops back to block 45.

At block 51, feedback related to one of said live events is received from at least one of the remote viewers. As indicated by the dotted line between blocks 49 and 51, the feedback may preferably depend on the remote viewer receiving and perceiving the transferred recording at block 49. However, it is to be understood that the processing at block 51 may also be independent of the transferred recording. At block 53, an interactive environment hosting the related live event is determined based on the feedback and the determined interactive environment is directly updated based on the feedback at block 55. Thereafter, the method loops back to block 51 and continues receiving further feedback. Yet, it is to be understood that the method may also asynchronously receive any feedback at block 51 and trigger the subsequent processing in blocks 53 and 55 whenever a new feedback is received at block 51. Thus, the method need not wait until a particular feedback has been processed at block 51 and has subsequently modified the interactive environment. Also, the processing at blocks 53 and 55 may be performed concurrently and asynchronously in combination or with regard to each other for each interactive environment hosting a respective live event. The direct update may also preferably instantaneously modify the affected interactive environment, as indicated by the dotted line from block 55 to block 45, where the results may further be directly recorded and transferred to the remote audience.

Even though the method according to an embodiment of the present disclosure has been described with reference to an exemplary embodiment, it is to be understood that particular processing steps may be modified, added, and omitted without leaving the scope of the present disclosure. Also, the processing steps may be performed in a different order from the example described.

In general, embodiments of the present disclosure enable a remote audience to participate in a live event, like a concert, sports event, TV show, or the like, via a connected device by providing feedback to an interactive environment hosting said live event. The present disclosure therefore enables a remote audience to directly participate with the live event in a similar way as a local audience present at the location of the live event. For example, the inventive system according to an embodiment of the present disclosure may present the feedback of the remote and local audience on display devices, such as a visual screen or similar presentation methods, which may be visible for all or at least to most of the audience. Preferably, the system may process the feedback via a connection, such as provided via Internet, phone lines, or such, and transfer the processed feedback data to the interactive environment hosting the event, for example, for display on the visual screen or similar presentation methods visible for all audience as well as further performers of the live event. Thus, the inventive approach allows for at least partially replacing or enhancing the typically local audience with a remote audience, which may directly interact with the live event irrespective of its location.

It is to be understood that many modifications may be provided to particular embodiments of the invention without leaving the scope of the invention. In particular, the invention may be practiced within the scope of the claims differently from the examples described and the described features and characteristics may be of importance for the invention in any combination.

The invention claimed is:

1. A system for remote participation in live events, comprising:
   a plurality of interactive environments, each hosting a live event and including a computing device configured to continuously record the interactive environment;
   a transmitter coupled to the plurality of interactive environments, wherein the transmitter is configured to receive from each interactive environment the respective recording and to transfer each recording to at least some of a plurality of remote viewers; and
   a processing unit configured to receive feedback related to one of said live events from two or more of the remote viewers,
   wherein, based on the feedback, the processing unit is further configured to determine an interactive environment hosting the related live event and to directly update the determined interactive environment based on the feedback, and
   wherein the processing unit comprises a middleware module configured to asynchronously organize the communication between the processing unit and the plurality of remote viewers, wherein the middleware module is configured to expose a plurality of network connections for receiving the feedback of the remote viewers and transferring data processed by the processing unit to the determined interactive environment of the plurality of interactive environments, wherein the middleware module is further configured, if one of the plurality of remote viewers is participating in more than one live event, to filter all requests and feedback of the one remote viewer towards a correct live event session so that data is stored and processed in connection to a respective live event session.

2. The system of claim 1, further comprising one or more feedback channels to couple at least some of the remote viewers to the processing unit, each feedback channel associated with one interactive environment.

3. The system of claim 1, further comprising one or more transfer channels, each associated with one interactive environment, wherein the processing unit is configured to transfer the recording of an interactive environment to at least some of the remote viewers via the associated transfer channels.

4. The system of claim 1, further comprising a security component configured to authenticate a remote viewer and to authorize participation of the remote viewer in one of said interactive environments.

5. The system of claim 1, wherein a plurality of local viewers in at least one of said interactive environments is coupled to the processing unit via one of said feedback channels and wherein the processing unit is further configured to receive feedback related to the local live event from at least one of the local viewers and, based on the received feedback, update the local interactive environment.

6. The system of claim 3, wherein the transmitter is configured to broadcast and/or stream the recording via at least one of the transfer channels, including at least a television channel and an internet live stream.

7. The system of claim 1, further comprising, at each remote viewer, an interaction device including an output device for receiving and rendering at least one recording and an input device for generating feedback on the displayed at least one recording.

8. The system of claim 1, wherein the processing unit is further configured to process the feedback from a plurality of remote and/or local viewers and compute at least one value based on the processed feedback.

9. The system of claim 1, wherein, based on the received feedback, the processing unit is configured to generate a visual representation and to update the interactive environment by displaying said visual representation within the interactive environment.

10. The system of claim 1, wherein each live event is one of a sports event, a cultural event, a social event, a television show, a political speech, or a live conference.

11. The system of claim 1, wherein the interactive environment is a computer-generated environment, including at least one of a concurrently or synchronously experienced game-session, a live collaborative engagement of users, or a social environment.

12. A method for remote participation in live events, comprising:
providing a plurality of interactive environments, each hosting a live event;
continuously recording each interactive environment;
receiving from each interactive environment the respective recording and transferring each recording to at least some of a plurality of remote viewers;
receiving feedback related to one of said live events from two or more of the remote viewers;
determining, based on the feedback, an interactive environment hosting the related live event;
directly updating the determined interactive environment based on the feedback; and
asynchronously organizing communication with the plurality of remote viewers using a middleware module, wherein the middleware module is configured to expose a plurality of network connections for receiving the feedback of the remote viewers and transferring processed data to the determined interactive environment of the plurality of interactive environments, wherein the middleware module is further configured, if one of the plurality of remote viewers is participating in more than one live event, to filter all requests and feedback of the one remote viewer towards a correct live event session so that data is stored and processed in connection to a respective live event session.

13. The method of claim 12, further comprising providing one or more feedback channels, each feedback channel to transfer feedback associated with one of the interactive environments.

14. The method of claim 12, further comprising providing one or more transfer channels, each transfer channel to transfer the recording of one interactive environment to at least some of the remote viewers.

15. The method of claim 12, further comprising authenticating a remote viewer and authorizing participation of the remote viewer in one of said interactive environments.

16. The method of claim 12, further comprising receiving from at least one of a plurality of local viewers in an interactive environment feedback related to the local live event and, based on the received feedback, updating the local interactive environment.

17. The method of claim 14, wherein transferring the recording includes broadcasting and/or streaming the recording via at least one of the transfer channels.

18. The method of claim 12, further comprising processing the feedback from a plurality of remote and/or local viewers and computing at least one value based on the processed feedback.

19. The method of claim 12, further comprising, based on the received feedback, updating the interactive environment by initiating an action within the interactive environment.

20. The method of claim 12, further comprising, based on the received feedback, generating a visual representation and updating the interactive environment by displaying said visual representation within the interactive environment.

21. A non-transitory computer-readable medium having instructions stored thereon, wherein said instructions, when installed and executed on a computing device, cause said computing device to:
provide a plurality of interactive environments, each hosting a live event;
continuously record each interactive environment;
receive from each interactive environment the respective recording and transfer each recording to at least some of a plurality of remote viewers;
receive feedback related to one of said live events from two or more of the remote viewers;
determine, based on the feedback, an interactive environment hosting the related live event;
directly update the determined interactive environment based on the feedback; and
asynchronously organize communication with the plurality of remote viewers using a middleware module, wherein the middleware module is configured to expose a plurality of network connections for receiving the feedback data of the remote viewers and transferring processed data to the determined interactive environment of the plurality of interactive environments, wherein the middleware module is further configured, if one of the plurality of remote viewers is participating in more than one live event, to filter all requests and feedback of the one remote viewer towards a correct live event session so that data is stored and processed in connection to a respective live event session.

* * * * *